Dec. 17, 1957  P. SPERRY  2,816,951
LOCKING BUSHING
Filed Aug. 25, 1955

INVENTOR.
Pierce Sperry.
BY Wood, Herron & Evans
ATTORNEYS.

United States Patent Office 2,816,951
Patented Dec. 17, 1957

2,816,951

LOCKING BUSHING

Pierce Sperry, Harrison, Ohio, assignor to The Sperry Rubber and Plastics Company, Brookville, Ind., a corporation Application August 25, 1955, Serial No. 530,475

5 Claims. (Cl. 174—157)

This invention relates to a rubber bushing which is adapted to be installed in an aperture in a wall, such as the fire wall of an automobile which separates the engine compartment from the passenger compartment, to seal, to electrically insulate, to resiliently mount, and to lock against longitudinal displacement wires, rods, cables etc. which pass through the aperture.

In copending patent application Serial No. 530,474, filed August 25, 1955, I have disclosed a rubber bushing device which is adapted to be used for substantially the same purpose as the present bushing. However, the copending application is concerned primarily with a means of mounting a bushing device and locking it in place relative to the wall; whereas the present application is concerned more with locking the wires, cables, etc. which pass through the bushing relative to the bushing so as to prevent longitudinal movement of the wires etc. The present invention also concerns a means for securing the bushing in place relative to the wall, however, this is a secondary aspect of the invention inasmuch as the primary objective is to provide an efficient lock betwen the bushing and the wires which are journalled by the bushing.

Figure 1:
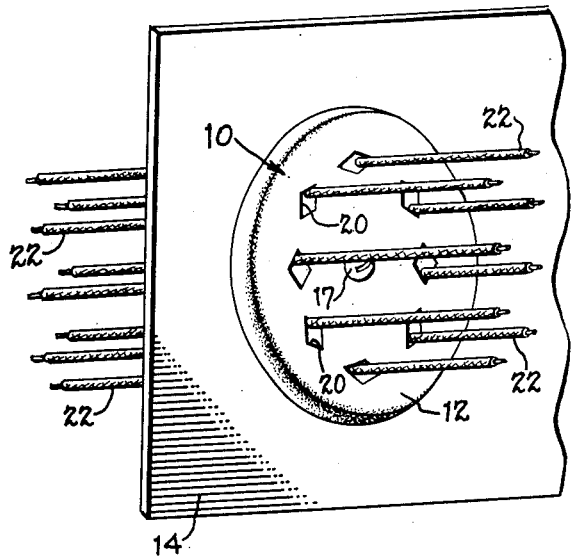
Figure 1 is a perspective view showing a bushing incorporating the principles of the present invention installed in an aperture through which wires must pass, the aperture being formed in a thin panel such as the sheet metal wall.

The bushing, which is indicated generally by the numeral 10 in the drawings consists of two mating parts 11 and 12 which, in the preferred embodiment, are of identical construction. These parts are made of rubber molded to the configuration shown. Each part is disk-like in shape and each part is substantially greater in diameter than a circular aperture 13 to which the bushing is adapted to be applied. This aperture may exist in a sheet metal panel such as the one designated 14 or in any thin wall through which a plurality of wires or the like are to pass. The two parts of the bushing are disposed at opposite sides of the wall and are in interfacial contact within the aperture as shown. Specifically, each one of the bushing parts has a flat circular land 15 at its inner face which is raised with respect to a flat annular area designated 16 which is in the rim portion thereof by an amount equal to one-half of the thickness of the wall to which the bushing is to be affixed. The respective circular lands 15 thus abut one another within the aperture.

Figure 6:
Figure 6 is a fragmentary cross sectional view taken on the same plane of Figure 2 illustrating a modified fastening device for locking together the two parts comprising the bushing.

When installed, the two bushing parts may be secured to one another by means such as an ordinary bolt and nut 17 which passes through the respective centers of the disk-like parts. Obviously other means may be provided to secure the two parts together such as, by way of example, the one shown in Figure 6 wherein a headed stud 18 which is on one of the two parts is received in a mating socket 19 formed in the opposite one of the two parts. The stud and socket are disposed at the center of the two parts so that one part may be rotated with respect to the other part for purposes which will be described.

Figure 2:
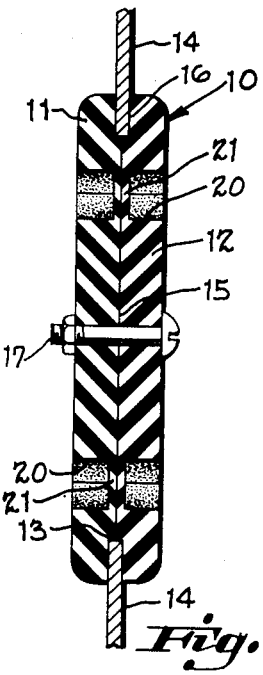
Figure 2 is a cross sectional view taken on a plane passing vertically downwardly through the center of the bushing showing it installed at an aperture in a wall.
Figure 3:
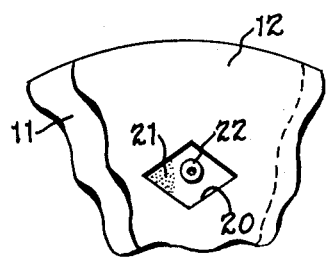
Figure 3 is a fragmentary elevational view of a portion of the bushing illustrating the appearance of the locking means provided for securing wires etc. in the bushing.
Figure 4:
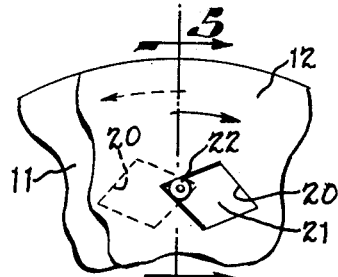
Figure 4 is a view similar to Figure 3 showing the bushing in locked condition.
Figure 5:
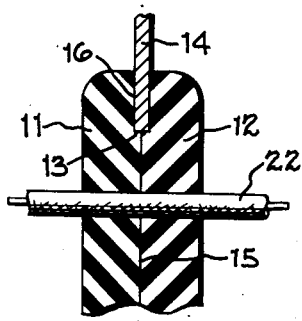
Figure 5 is a fragmentary cross sectional view taken on the line 5—5 of Figure 4.

Each one of the two bushing parts 11 and 12 has a plurality of diamond-shaped niches 20 formed in its outer face, which niches are disposed in equally spaced relationship around the center of the bushing part such that one of their respective axes (the major one preferably) is tangent to a circle concentrically located on that part. The niches constitute depressions which extend substantially all of the way through the bushing element from the outer face thereof to a plane which is parallel to but spaced from the inner surface of the land 15 so as to leave a thin, rupturable diaphragm 21 which is at the inner end of each niche. Thus, when two of the bushing parts are mounted in an aperture as shown in Figure 2, and the parts are arranged so that the niches in one are in alignment with the niches in the other one, as shown in Figure 3, wires or similar elements, such as are indicated at 22, may be forced through the respective, aligned diaphragms rupturing them to pass through the aperture. With the wires thus in place, one disk may then be rotated with respect to the other disk so that the wires or other elements become wedged into the respective opposite ends of the previously aligned niches of each pair. This condition is shown in Figure 4. During such movement, the thin webs or diaphragms 21 may be torn slightly but such damage is of no consequence inasmuch as the thin rubber gives readily and since the niches are now misaligned except for that part of each one through which the wire extends, there is little likelihood of dust or air passing through the bushing along the side of the wire. As illustrated in the cross sectional view of Figure 5, each wire is now encased above and below with rubber and it is pinched between the two parts and thus tightly gripped where the two inner faces of the disk-like parts meet.

It will be seen, therefore, that with the two disks locked the wires or other elements which are mounted in the bushing are insulated electrically from one another and from the panel or wall 14. They are also mounted in a rubber medium which absorbs vibrations and other shocks. Furthermore, the openings surrounding the wires are sealed, and in addition, the wires etc. are securely locked relative to the bushing so that they cannot be displaced longitudinally with respect to it.

Having described my invention I claim:

1. A rubber bushing for mounting, locking and insulating a plurality of wires and the like within a circular aperture in a wall through which said wires must pass, said bushing comprising a pair of disk-like parts which are larger in diameter than the circular aperture and which have inner faces adapted to meet in interfacial contact within the aperture when the two parts are mounted at the aperture on opposite sides of the wall, means located on the respective central axes of the disks for fastening them together through the aperture, each of said parts having a plurality of diamond-shaped niches in its outer face, said niches being equally spaced around a circle which is concentric to the axis of the means rotatably fastening the two parts together and being oriented with their major axes tangent to said circle, each of said niches formed to provide a thin, rupturable diaphragm at the inner side thereof, and the means fastening the two disk-like parts together being arranged so as to permit rotation of one of said parts with respect to the other one of said parts whereby a plurality of wires inserted through the respective rupturable diaphragms of aligned diamond-shaped niches may be wedged simultaneously and equally into the respective opposite ends of said niches and held therein upon rotation of one part relative to the other.

2. A rubber bushing for mounting, locking and insulating a plurality of wires and the like within a circular aperture in a wall through which said wires must pass, said bushing comprising a pair of identical disk-like parts, said disk-like parts having inner faces adapted to meet in interfacial contact within the aperture when the two parts are mounted at the aperture on the respective opposite sides of the wall, each of said parts having a plurality of diamond-shaped niches in its outer face, said niches being equally spaced from one another and disposed with one of their respective axes tangent to a circle which is concentrically disposed on the part, each of said niches formed to provide a thin, rupturable diaphragm at the inner side thereof, and means fastening the two disk-like parts together, said means being arranged so as to permit rotation of one of said parts with respect to the other one of said parts, whereby a plurality of wires inserted through the respective rupturable diaphragms of aligned diamond-shaped niches may be wedged simultaneously and equally into the relative opposite ends of said niches and held therein upon rotation of one part relative to the other.

3. A rubber bushing for mounting, locking and insulating a plurality of wires and the like within a circular aperture in a wall through which said wires must pass, said bushing comprising a pair of identical disk-like parts having inner faces adapted to meet in interfacial contact within the aperture when the two parts are mounted at the aperture on opposite sides of the wall, means located on the respective central axes of the disks for fastening them together through the aperture, each of said parts having a plurality of identical niches in its outer face, said niches being equally spaced from one another and from the center of the part and formed to provide a thin, rupturable diaphragm at the inner side thereof, and the means fastening the two disk-like parts together being arranged so as to permit rotation of one of said parts with respect to the other one of said parts, whereby a plurality of wires inserted through the respective rupturable diaphragms of aligned niches may be pinched between the niches and held therein upon rotation of one part relative to the other.

4. A rubber bushing for mounting, locking and insulating a plurality of wires and the like within an aperture in a wall through which said wires must pass, said bushing comprising a pair of identical disk-like parts having planar inner faces adapted to contact one another within the aperture when the two parts are mounted at the aperture on opposite sides of the wall, each of said parts having a plurality of niches in its outer face, said niches being symmetrically arranged around the central axis of the part, each of said niches formed to provide a thin, rupturable diaphgram at the inner side thereof, and means fastening the two disk-like parts together at their centers to permit rotation of one of said parts with respect to the other one of said parts, whereby a plurality of wires inserted through the respective rupturable diaphragms of aligned niches may be wedged simultaneously and equally into the respective opposite ends of said niches and held therein upon rotation of one part relative to the other.

5. A rubber bushing as set forth in claim 4 in which the niches in each part are diamond-shaped and arranged with their major axes tangent to a circle centered on the part.

References Cited in the file of this patent
UNITED STATES PATENTS 1,697,814 Forbes Jan. 1, 1929
2,134,350 Woolley Oct. 25, 1938